(No Model.)
2 Sheets—Sheet 1.

A. B. DAVIS.
COMBINED WEIGHING SCALE AND REGISTER.

No. 319,199. Patented June 2, 1885.

WITNESSES:
L. Douville
W. F. Kircher

INVENTOR:
A. B. Davis.
BY John A. Wiedersheim
ATTORNEY.

(No Model.) 2 Sheets—Sheet 2.

A. B. DAVIS.
COMBINED WEIGHING SCALE AND REGISTER.

No. 319,199. Patented June 2, 1885.

UNITED STATES PATENT OFFICE.

AUGUSTUS B. DAVIS, OF PHILADELPHIA, PENNSYLVANIA.

COMBINED WEIGHING-SCALE AND REGISTER.

SPECIFICATION forming part of Letters Patent No. 319,199, dated June 2, 1885.

Application filed October 29, 1884. (No model.)

*To all whom it may concern:*

Be it known that I, AUGUSTUS B. DAVIS, a citizen of the United States, residing in the city and county of Philadelphia, State of Pennsylvania, have invented a new and useful Improvement in a Combined Scale and Register, which improvement is fully set forth in the following specification and accompanying drawings, in which—

Figure 1:
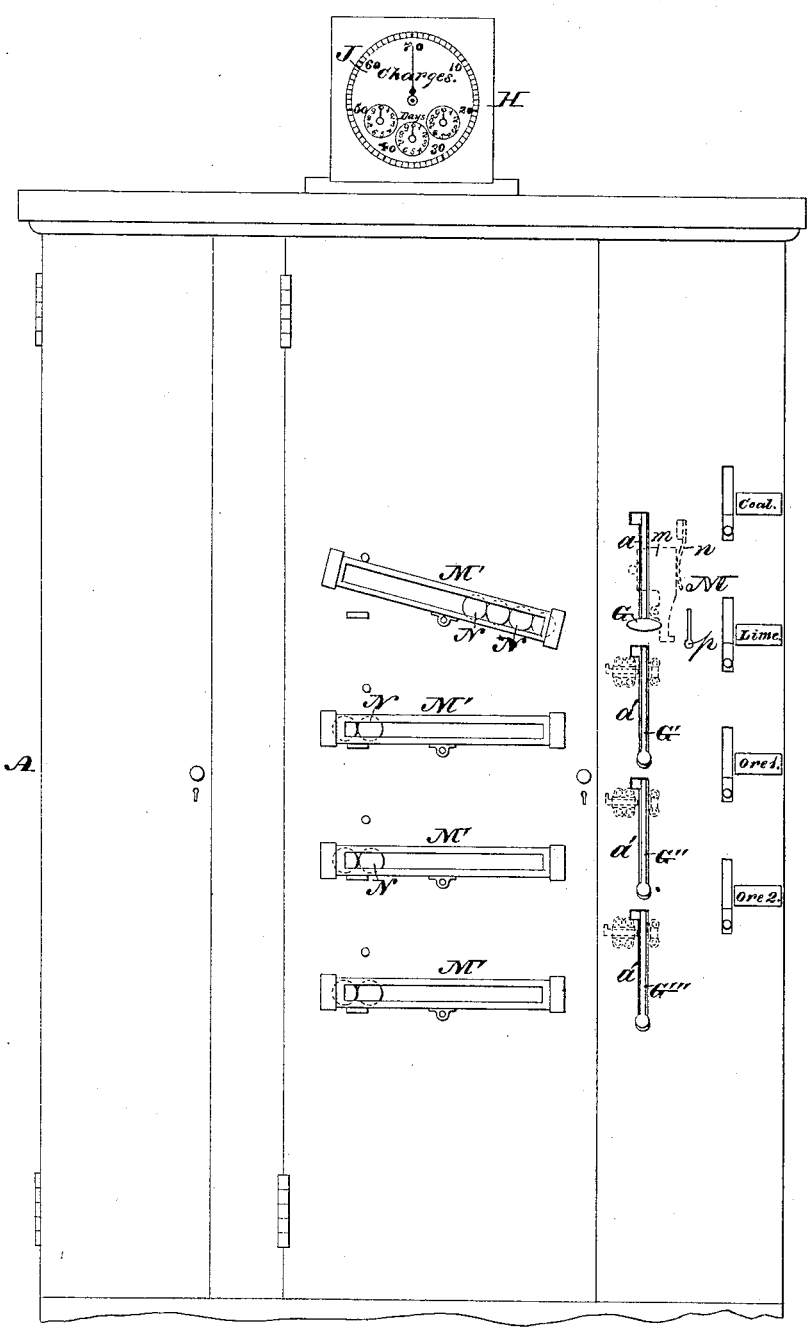
Figure 2:
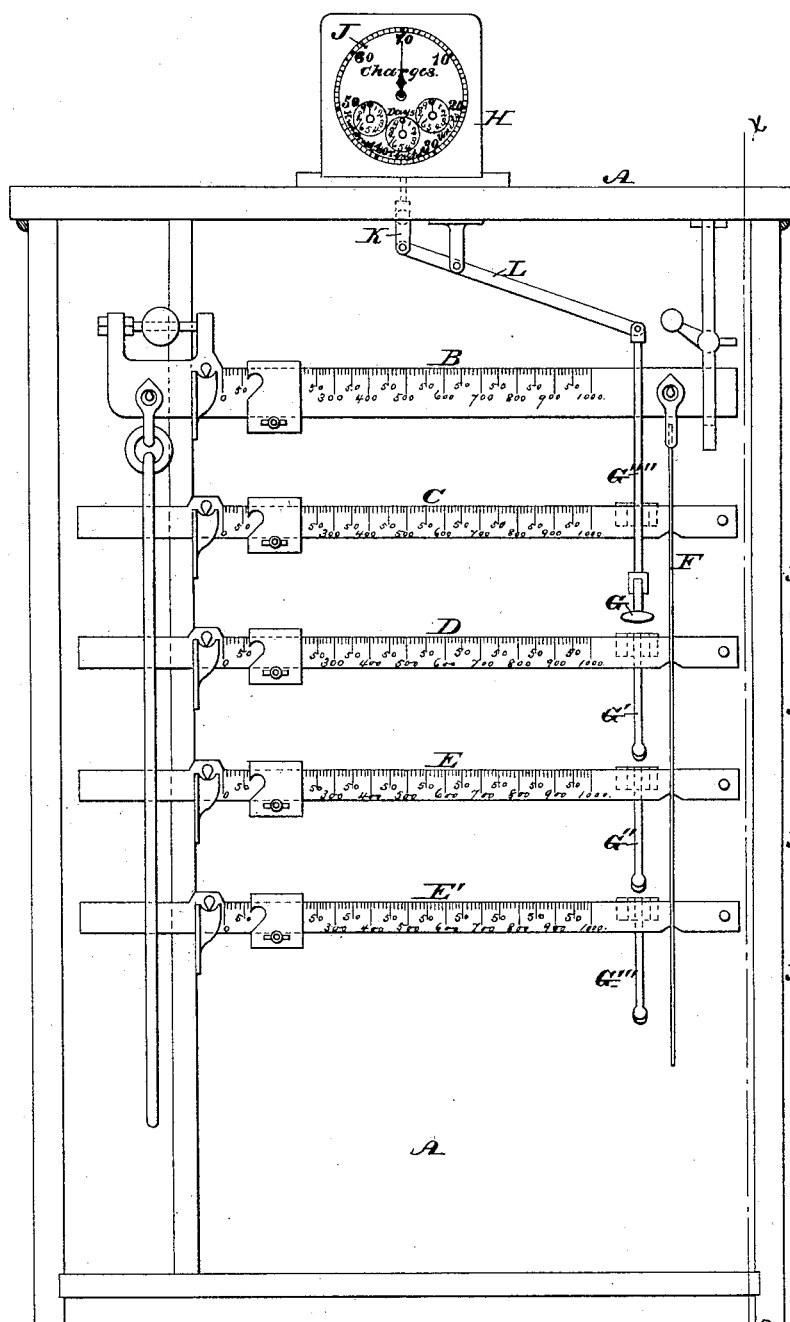
Figure 3:
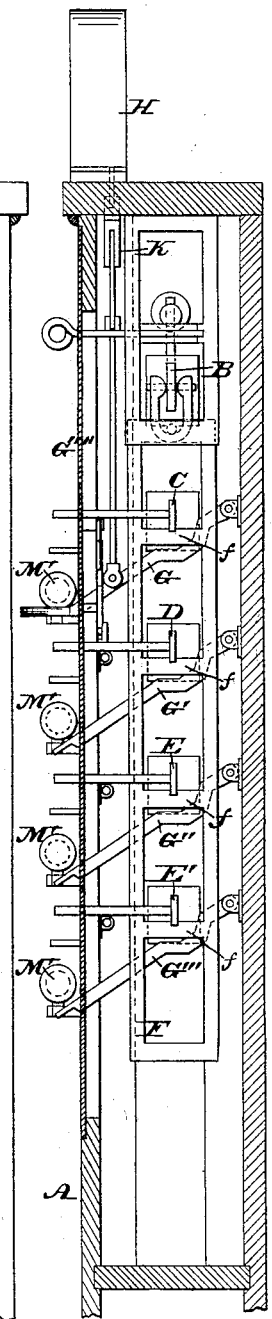

Figure 1 represents a front view of a scale and register embodying my invention. Fig. 2 represents a view of the interior of the scale-casing and the register located thereon. Fig. 3 represents a vertical section thereof on line $x$ $x$, Fig. 2.

Similar letters of reference indicate corresponding parts in the several figures.

My invention consists of a scale provided with a register, the beams or adjustable weights of the former being so connected with the latter that the act of placing a beam or weight in or out of position for weighing will operate the register.

The invention will be found especially serviceable for purposes of blast-furnaces, so that a register of the charges of the same may be readily kept.

Referring to the drawings, A represents a scale which is similar to that shown in the Letters Patent of the United States No. 37,569, granted to me on the 3d day of February, 1863, or may be similar to that shown in the Letters Patent of the United States No. 67,264, granted to me on the 30th day of July, 1867; but in lieu thereof I may use any other multiple-beam scale or charging-scale, wherein there is a weighing-beam and an auxiliary weighing apparatus and means for throwing the auxiliary weighing apparatus in and out of connection with the weighing-beam for the purpose of weighing various substances.

The scale A is provided with the main weighing-beam B and the auxiliary beams C D E E', the auxiliary beams being shown as intended for weighing coal, lime, and ores adapted for a charge of a blast-furnace, and may be of any number relatively to the different materials that may be required for the blast.

Suspended on a knife-edged bearing on the main beam B is a stirrup, F, having knife-edged steps $f$, corresponding to the number of supplementary beams or adjustable weights.

Pivoted to the back of the casing of the scale is a series of levers, G, G', G'', and G''', which pass beneath the supplementary beams and have their front ends working in angular slots $a$ $a'$ in the front of the casing.

H represents a register placed on top of the frame A, and having an ordinary train of gearing, the larger dial J of which is divided into seventy equal spaces, that being the usual number of charges per diem of a furnace; but it may be graduated in any number as desired. The three smaller dials register the number of days' work, seventy charges being counted as one day's work, as shown in the drawings, indicating units, tens, and hundreds thereof.

The operating-lever K of the register is passed into the casing of the scale and connected in any suitable manner with one end of a lever, L, which is pivoted to the top of the casing. The other end of the lever L is secured to the lever G by a connecting-rod, G''''; or the operating-lever of the register may be directly attached to the lever G.

M represents a locking device, which consists of the bolt $m$, the upper arm of which, being forced by the spring $n$, passes across the face of the slot $a$ in the front casing, thereby preventing the raising or lowering of the lever G. A key inserted in the opening $p$ and pressed against the lower portion of the bolt $m$ forces back the upper portion, so as to release the lever G.

It will be seen that when it is desired to charge the furnace the lever G is released by forcing back the bolt $m$, and is then drawn down in the lower part of the slot $a$, thus operating the levers L K and moving the hand of the larger dial one space. The charge of coal may now be weighed and the lever raised in the slot and locked. The lime and the different ores are also weighed and disposed of, after which the lever G is again released and thrown back, thus moving the hand of the dial another space. This operation is continued until the charging is effected, it being evident that the register indicates the number of charges made. If desired, each of the supplementary beams may be attached to different registers, and a separate tally kept of each material weighed; but this is not necessary, as the connection with the coal-beam fully answers the purpose desired. A bolt may be used to lock the lime and ore beams when not in use.

Pivotally connected to the front of the casing and corresponding to the number of supplementary beams are boxes or tubes M', closed at their ends and open in their sides. Within these tubes are placed balls N, according to the number of loads or barrows of the different materials required for each blast. Thus if two thousand pounds of coal, one thousand pounds each of lime, ore No. 1, and ore No. 2 are necessary for a blast, four balls would be placed in the upper frame and two in each of the others, by which means the person weighing the charge would be less liable to make an error, one of the balls being moved each time that a load or barrow is weighed. The tubes are so constructed or weighted at one end as not to turn on their axes or tip over until all the balls necessary to be placed therein have been moved to the other end thereof. When the amount of a charge is weighed, the tubes which have turned on their axes are thrown up, and thus the balls return to their normal positions, the tubes being reset.

In practice in charging a blast-furnace a load is considered to be five hundred pounds of material; hence the above calculation.

Having thus described my invention, what I claim as new, and desire to secure by Letters Patent, is—

1. A scale provided with a register having its beam connected therewith and a device for throwing said beam in and out of position for weighing, whereby the operation of said device causes the operation of the register, substantially as described.

2. A scale having a weighing-beam and an auxiliary weighing apparatus, in combination with a register and a device for throwing said apparatus in and out of connection with the weighing-beam, whereby the operation of said device operates the register, substantially as described.

3. A scale-beam, in combination with a register and means for operating said register, and a locking device which prevents the operation of the means by which a register is made, substantially as described.

4. In a combined scale and register, the combination of the scale-beams with means for locking the same and operating the register, and a register, substantially as described.

5. A main beam, in combination with a supplementary scale-beam, a register, and means for actuating either one of said beams, so that the number of weighings by said beam may be indicated by said register, substantially as described.

6. A combined scale and register having tubes secured to the casing of the scales and balls within said tubes, whereby the number of loads of different materials required for any purpose may be shown, substantially as described.

7. The scale-beam B, in combination with a stirrup, a series of auxiliary scale-beams, pivoted levers for raising said scale-beams from the steps of said stirrup, and a register connected to one of said pivoted levers, whereby a register is made of the number of weighings, substantially as and for the purpose set forth.

A. B. DAVIS.

Witnesses:
JOHN A. WIEDERSHEIM,
A. P. GRANT.